Jan. 27, 1953
C. L. FOUT
2,626,654
HEADREST
Filed Aug. 17, 1951
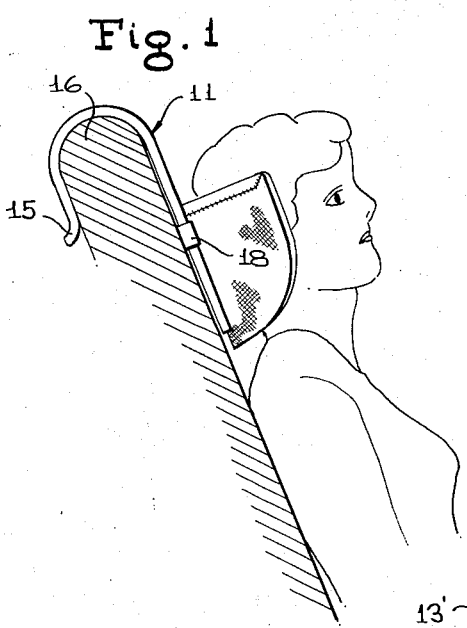
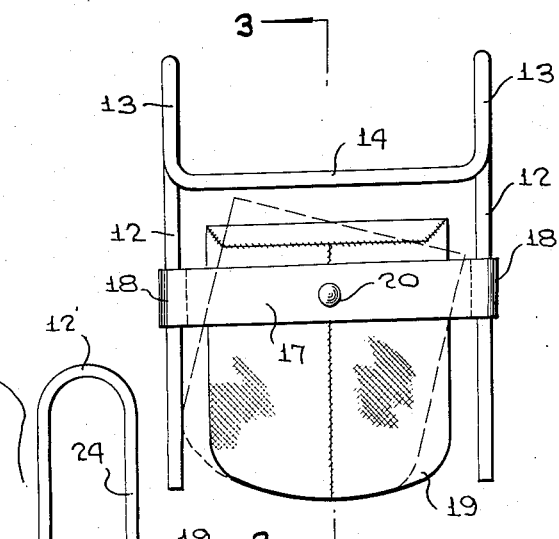
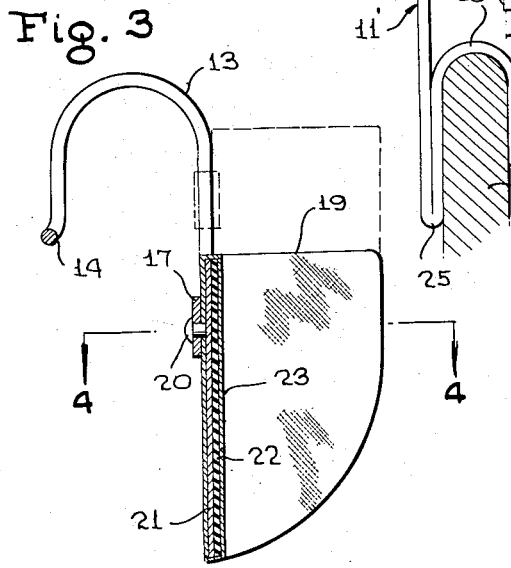
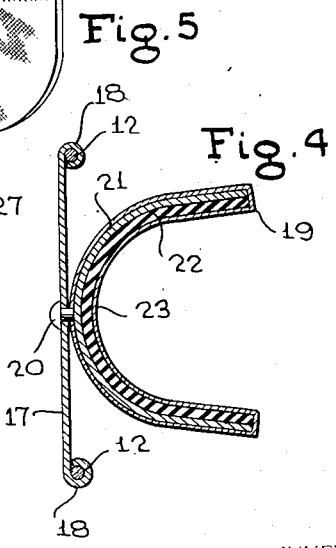
INVENTOR
CHARLES L. FOUT
BY
McMorrow, Berman + Davidson
ATTORNEYS Patented Jan. 27, 1953

2,626,654

UNITED STATES PATENT OFFICE 2,626,654

HEADREST

Charles L. Fout, Corpus Christi, Tex.

Application August 17, 1951, Serial No. 242,317

5 Claims. (Cl. 155—174)

This invention relates to head rest devices, and more particularly to a portable head rest device adapted for use in motor vehicles, railway cars, buses and the like.

The main object of the invention is to provide a novel and improved head rest device which is simple in construction, which is easy to mount on the back of a seat, and which provides comfortable support of the user's head during a journey.

A further object of the invention is to provide an improved portable head rest device which may be readily mounted on the back of the seat of a motor vehicle or other vehicle, the device being inexpensive to manufacture, readily adjustable to the desired position required for the supporting element thereof, sturdy in construction and attractive in appearance.

Further objects and advantages of the invention will become apparent from the following description and claims, and from the accompanying drawings, wherein:

Figure 1 is a side elevational view of one form of improved head rest device according to the present invention shown mounted on the back of a vehicle seat and arranged to support the head of a passenger;

Figure 2 is a front elevational view of the head rest device of Figure 1;

Figure 3 is a vertical cross sectional view taken on the line 3—3 of Figure 2;

Figure 4 is a horizontal cross sectional view taken on the line 4—4 of Figure 3; and Figure 5 is a side elevational view showing a further form of improved head rest device in accordance with the present invention.

Referring to the drawings, and more particularly to Figures 1 to 4, the head rest device is designated generally at 11 and comprises a wire frame having the parallel depending side legs 12, 12 which are formed at their top portions with the rearwardly directed downwardly facing resilient loops 13, 13, the ends of the loops being connected by a transverse arm 14. As shown in Figure 1, the ends of the clamping loops 13, 13 are curved outwardly, as shown at 15 in Figure 1, to facilitate the engagement of the clamping loops on the top edge 16 of a vehicle seat.

Designated at 17 is a transversely extending arm formed at its ends with sleeve elements 18, 18 frictionally engaging the respective depending side legs 12, the frictional engagement of the sleeve elements 18, 18 with said legs 12, 12 being sufficient to retain the transverse bar 17 in adjusted position after it has been moved relative thereto. Designated at 19 is an upholstered, U-shaped, forwardly facing saddle member serving as the head-supporting element of the device. The bight portion of the saddle member has secured thereto the rivet 20 which extends rotatably through the intermediate portion of the transverse bar member 17, and which provides the pivotal connection of the saddle member 19 to the bar 17. The saddle member 19 may comprise a metal supporting element 21 having a sponge rubber lining 22 secured to its inside surface, said element 21 and sponge rubber lining 22 being covered by a narrow covering 23 of plastic, fabric or other flexible material.

In using the device, the clamping loops 13, 13 are engaged over the top edge of a vehicle seat as shown in Figure 1, and the saddle member 19 is adjusted to its most comfortable position for the particular passenger, the adjustment being effected by sliding the sleeve portions 18, 18 along the arms 12, 12. The saddle member 19 may then be rotatably adjusted about the rivet 20 to the position found to be most comfortable for the support of the passenger's head.

Referring now to a modified form of the invention shown in Figure 5, the device is designated generaly at 11' and comprises the wire frame having the parallel U-shaped top portions 12' formed on the parallel legs 13'. The saddle member 19 is pivotally mounted on the bar 17 in the manner described in connection with Figures 1 to 4, and the bar 17 has end sleeves 18 slidably engaged on the depending arms 24 at the forward sides of the U-shaped members 12'. The lower ends of the legs 13' are reversely bent at 25 and are formed with the resilient downwardly facing U-shaped loops 26 which are connected at their forward ends by a transverse arm, not shown, similar to the arm 14 in Figure 2. The respective clamping loops 26 are located substantially in vertical alignment with the respective U-shaped frame elements 12'.

In using the device shown in Figure 5, the clamping loops 26 are first positioned over the top edge of a vehicle seat 27, in the same manner as the loops 13 are positioned upon the vehicle seat 16. The sleeves 18 are then adjusted longitudinally of the depending arms 24, to a selected height found most comfortable by the particular passenger. Final adjustment for the passenger's comfort is effected by rotatable movement of the saddle 19 about the rivet extending therethrough.

The device illustrated in Figure 5 is particularly adapted to use upon vehicle seats such as are found in the ordinary passenger automobile, these seats being relatively low, and generally terminating at their top edges at a level below the head of the passenger. As will be seen, the modified form illustrated in Figure 5 offsets this characteristic of the seat of a passenger automobile, by providing an elongated element substantially coplanar with the vehicle seat, and extending a substantial distance thereabove, on which element the head-receiving saddle 19 is mounted for longitudinal adjustment.

The form of the invention illustrated in Figures 1 to 4 inclusive is, on the other hand, especially well adapted for application to seats such as are found in busses travelling between distant points.

In either instance, important characteristics of the invention reside in its applicability with speed and facility to a vehicle seat, in a manner whereby the seat will not be marred, and in a manner, further, that permits the device to be removed whenever desired. A further important characteristic of the invention is found in the ready adjustability of the head-receiving saddle thereof to any selected elevation, found most convenient by the passenger, and a still further characteristic is believed to reside in the rotatable adjustment of the saddle upon the head, which is effective to provide a support for the head that will not necessarily require that the head be held erect.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends all construction coming within the scope of the appended claims.

What is claimed is:

1. A head rest comprising a wire frame having parallel depending side legs, means on said frame clampingly engageable with the top edge of a vehicle seat back, a transverse bracket member slidably engaged on said side legs, and a U-shaped, forwardly facing saddle member pivotally secured at its bight portion to said transverse bracket member, said saddle member being adapted to supportingly receive the head of a passenger.

2. A head rest comprising a wire frame having parallel depending side legs, means on said frame clampingly engageable with the top edge of a vehicle seat back, a transverse bracket member mounted on said side legs to slide longitudinally thereof, and a forwardly facing saddle member of U-shape cross section pivotally secured at its bight portion to said bracket member for rotatable adjustment about an axis extending perpendicularly to the plane of sliding movement of the bracket member, said saddle member being adapted to supportingly receive the head of a passenger.

3. A head rest comprising a wire frame having parallel depending side legs, U-shaped loops integral with the legs at one end thereof and adapted for clamping engagement with the top edge of a vehicle seat back, means rigidly connecting said loops in transversely spaced relation, a transverse bracket member having end sleeves formed thereon receiving said side legs for slidable adjustment of the bracket member longitudinally of said legs, and a U-shaped, forwardly facing saddle member pivotally secured at its bight portion to said transverse bracket member and medially disposed between the side legs, said saddle member being rotatably adjustable about an axis extending perpendicularly to the plane of sliding movement of the bracket member and being adapted to supportingly receive the head of a passenger.

4. A head rest comprising a wire frame having parallel, depending side legs, U-shaped clamping loops integrally formed upon the respective legs at one end thereof and adapted for clamping engagement with the top edge of a vehicle seat back, means rigidly connecting said loops in transversely spaced relation, a transverse bracket member extending between said legs and including sleeves at opposite ends thereof receiving the legs for slidable adjustment of the bracket member longitudinally of the legs, said bracket member being mounted upon the other ends of the legs and spacing said other ends of the legs a distance apart from one another equal to the distance between the loops, and a U-shaped, forwardly facing saddle member pivotally secured at its bight portion to said transverse bracket member medially between said other ends of the legs, said saddle member being rotatably adjustable upon the bracket member about an axis extending perpendicularly to the plane of slidable movement of the bracket member and being adapted to supportingly receive the head of a passenger.

5. A head rest comprising a wire frame of integral formation and including a pair of parallel side legs, U-shaped top portions on one end of said legs, a second pair of legs rigid with said top portions and spaced rearwardly of the first-named legs, and U-shaped clamping loops rigid with the respective second-named legs and adapted for clamping engagement with the top of the vehicle seat, the first and second-named legs being disposed wholly above said clamping loops, a transverse bracket member slidably mounted upon said first-named legs for adjustment longitudinally thereof, and a U-shaped, forwardly facing saddle member pivotally secured at its bight portion to said transverse bracket member for rotatable adjustment about an axis extending perpendicularly to the plane of sliding movement of the bracket member, said saddle member being adapted to supportingly receive the head of a passenger.

CHARLES L. FOUT.

REFERENCES CITED

The following references are of record in the file of this patent:

UNITED STATES PATENTS

| Number | Name | Date |
| --- | --- | --- |
| 48,586 | Phelps | July 4, 1865 |
| 792,669 | Schaff | June 20, 1905 |
| 1,744,364 | Cruickshank | Jan. 21, 1930 |